（12）United States Patent
Yueh (10) Patent No.: US 8,378,984 B2
(45) Date of Patent: Feb. 19, 2013

(54) PRESSURE OPERATING APPARATUS AND OPERATING METHOD THEREOF

(76) Inventor: Chiu-Chen Yueh, Taipei Hsien (TW)

( * ) Notice: Subject to any disclaimer, the term of this patent is extended or adjusted under 35 U.S.C. 154(b) by 402 days.

(21) Appl. No.: 12/685,906

(22) Filed: Jan. 12, 2010

(65) Prior Publication Data

US 2010/0177040 A1    Jul. 15, 2010

(30) Foreign Application Priority Data

Jan. 14, 2009    (TW) .............................. 98101208 A (51) Int. Cl.
*G06F 3/041*    (2006.01)
(52) U.S. Cl. ....................................... 345/173; 345/156
(58) Field of Classification Search ........... 345/156–173
See application file for complete search history.

(56) References Cited

U.S. PATENT DOCUMENTS

| 2005/0052425 | A1* | 3/2005 | Zadesky et al. | 345/173 |
| 2005/0259069 | A1* | 11/2005 | Baker et al. | 345/156 |
| 2006/0181517 | A1* | 8/2006 | Zadesky et al. | 345/173 |
| 2008/0088600 | A1* | 4/2008 | Prest et al. | 345/173 |
| 2009/0057124 | A1* | 3/2009 | Orsley et al. | 200/600 |

* cited by examiner

*Primary Examiner* — Viet Pham
(74) *Attorney, Agent, or Firm* — Rosenberg, Klein & Lee (57) ABSTRACT

A pressure operating apparatus is used for controlling the movement of an operation object. One user can press down an insulating element to make a conductive element dispose below the insulating element to turn on at least one of switching elements. The turned on switching elements transmits a conductive signal respectively to a processing module. Finally, the processing module controls the movement of the operation object according to the conductive signal received simultaneously.

11 Claims, 11 Drawing Sheets

PRESSURE OPERATING APPARATUS AND OPERATING METHOD THEREOF

FIELD OF THE INVENTION

The present invention is related to a pressure operating apparatus, and more particular to a pressure operating apparatus operating the movement of an operation object according to the position and pressure of the user pressing on the pressure operating apparatus.

BACKGROUND OF THE INVENTION

Figure 1:
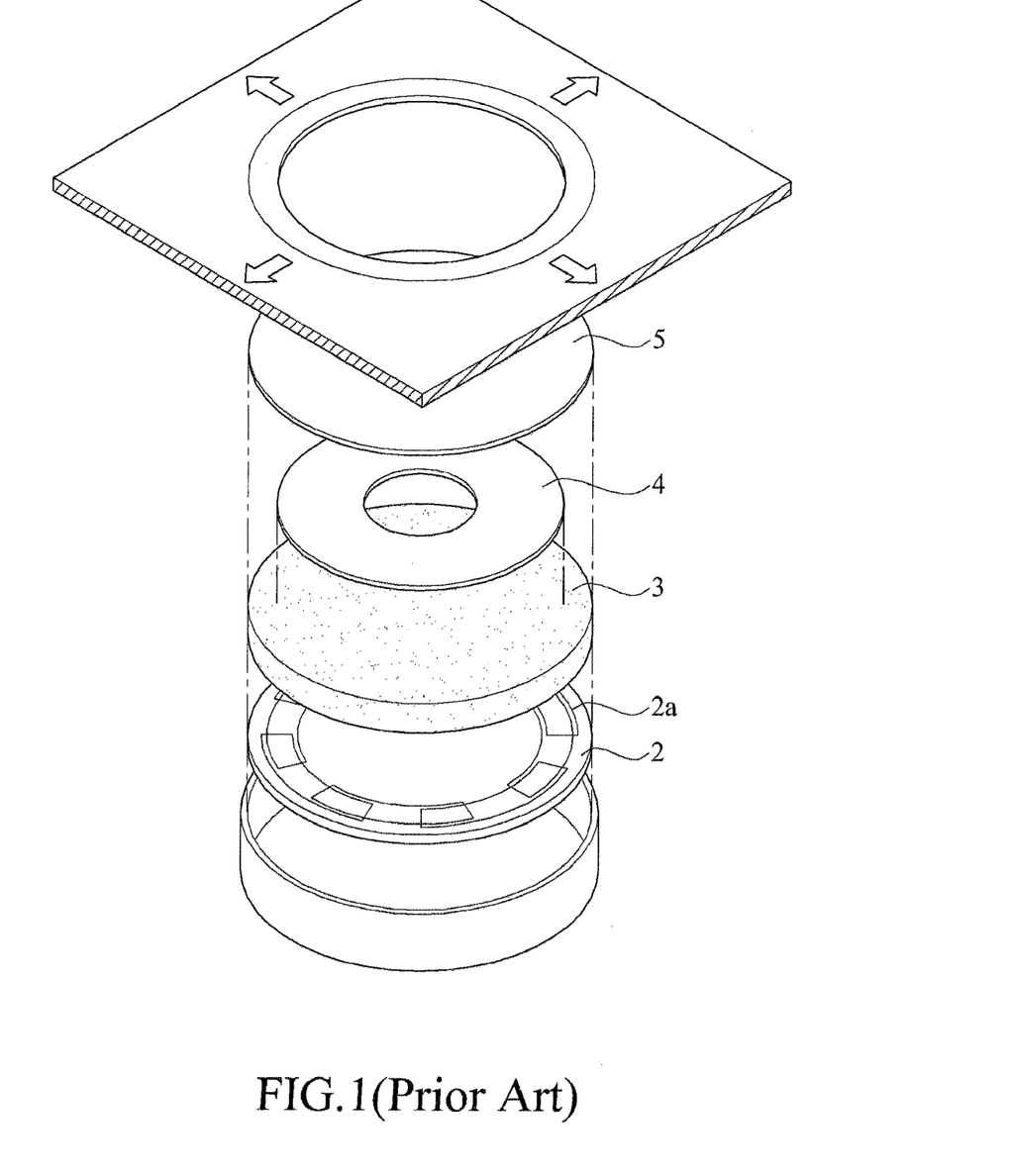
FIG. 1 is an exploded view that the illustrates a computer cursor device of prior art.
Figure 1A:
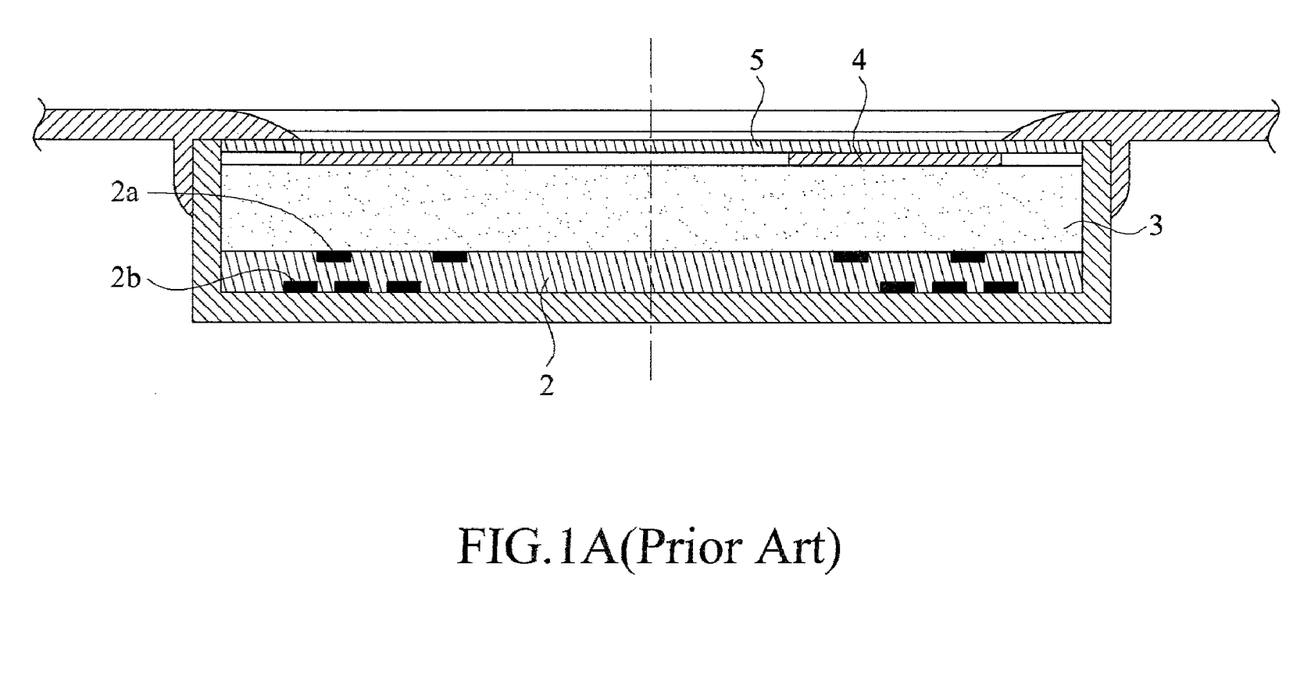
FIG. 1A is a cross-sectional view that illustrates a computer cursor device of prior art.

Please refer to FIG. 1 and FIG. 1A, which disclose a computer cursor device utilizing the theorem of electromagnetic induction in the prior art. The computer cursor device includes a transmitting winding coil $2b$ and a plurality of detecting winding coils $2a$. The transmitting winding coil $2b$ is formed by a single winding, and the detecting winding coils $2a$ are formed by a plurality of secondary windings respectively. A magnetic element 4 is disposed between the transmitting winding coil $2b$ and the detecting winding coils $2a$.

When the magnetic element 4 is pressed, the distance between the single winding and the secondary windings is changed, and the voltage outputted by the secondary windings will be changed too. Next, the voltage will be processed via amplifier, filter, scanner, and an analog-to-digital conversion to be a digital signal. Finally, the digital signal will be transmitted to MCU (Micro Controller Unit). The MCU will calculate the digital signal to a displacement quantity and the angular moving direction of a computer cursor. The angular moving direction is depended on the location of the secondary winding, which generates the changed voltage. Because, the more number the secondary windings generate the changed voltage, the more distance the computer cursor moves.

The prior art of utilizing the theorem of electromagnetic induction via the single winding and the secondary windings can control the velocity of the cursor according to the changing quantity of the voltage. However, there are many problems in the prior art needed to be solved. For example, the characteristic of the single winding and the secondary winding are influenced by the material, winding method of wire, and the material of the winding the wire. Even the characteristic is changed slightly, and the voltage will be changed huge. Especially, keeping the quantity of the force pressed down the voltage and the output of the voltage with a constant proportion is a great challenge. Besides, the voltage outputting by the secondary windings will be easily influenced by the electromagnetic generated by mobile phone, family electric appliances, or computer. However, the electromagnetic interference in the computer cursor device is a very hard to eliminate. Therefore, the computer cursor device in the prior art is needed to be improved.

SUMMARY OF THE INVENTION

To solve the lack of unstable outputting voltage and the electromagnetic interference of the computer cursor device, the object of the present invention is to provide a pressure operating apparatus. When a conductive element of the pressure operating apparatus is pressed to turn on at least one switching element, the turned on switching element will transmit a corresponding conductive signal. Finally, a processing module can control an operation object moving according to the conductive signal.

Accordingly, an objective of the present invention is to provide a pressure operating apparatus to operate an operation object. The pressure operating apparatus includes a substrate, a plurality of switching elements, a conductive element, and a processing module. The switching elements are disposed on the substrate. The conductive element is separated the switching elements a predetermined distance. When the conductive element is pressed down, at least one of the switching elements is turned on to transmit a conductive signal respectively.

Finally, the processing module receives the conductive signals, and controls the movement according to the number of the conductive signal received simultaneously.

Another objective of the present invention is to provide an operating method of the pressure operating apparatus. The steps of the operating method described below.

The pressure operating apparatus of the present invention includes a conductive element and a plurality of switching elements. The conductive element and the switching elements are separated from a predetermined distance. When the conductive element is pressed, at least one switching elements is turned on by the conductive element. Next, each of the turned on switching elements generates a conductive signal. The pressure operating apparatus controls the movement of the operation object according to the number of conductive signals, which are transmitted by the turned on switching elements respectively.

In conclusion, the pressure operating apparatus of the present invention controls the moving direction and velocity of the operation object according to the number of the turn on conductive element. The switching element contacts the conductive element mechanically. Accordingly, the present invention can overcome the unsteady current and the electromagnetic wave interference of the prior art. Additionally, the present invention can control the velocity of the operation object according to the force pressed on the conductive element and the number of the turned on switching elements. The present invention can also control the moving direction of the operation object according to the turned on switching elements.

Undoubtedly, the objective of the present invention will become obvious to those of ordinary skill in the art after reading the following detailed description of the preferred embodiment, which is illustrated in the various figures and drawings.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

Figure 2:
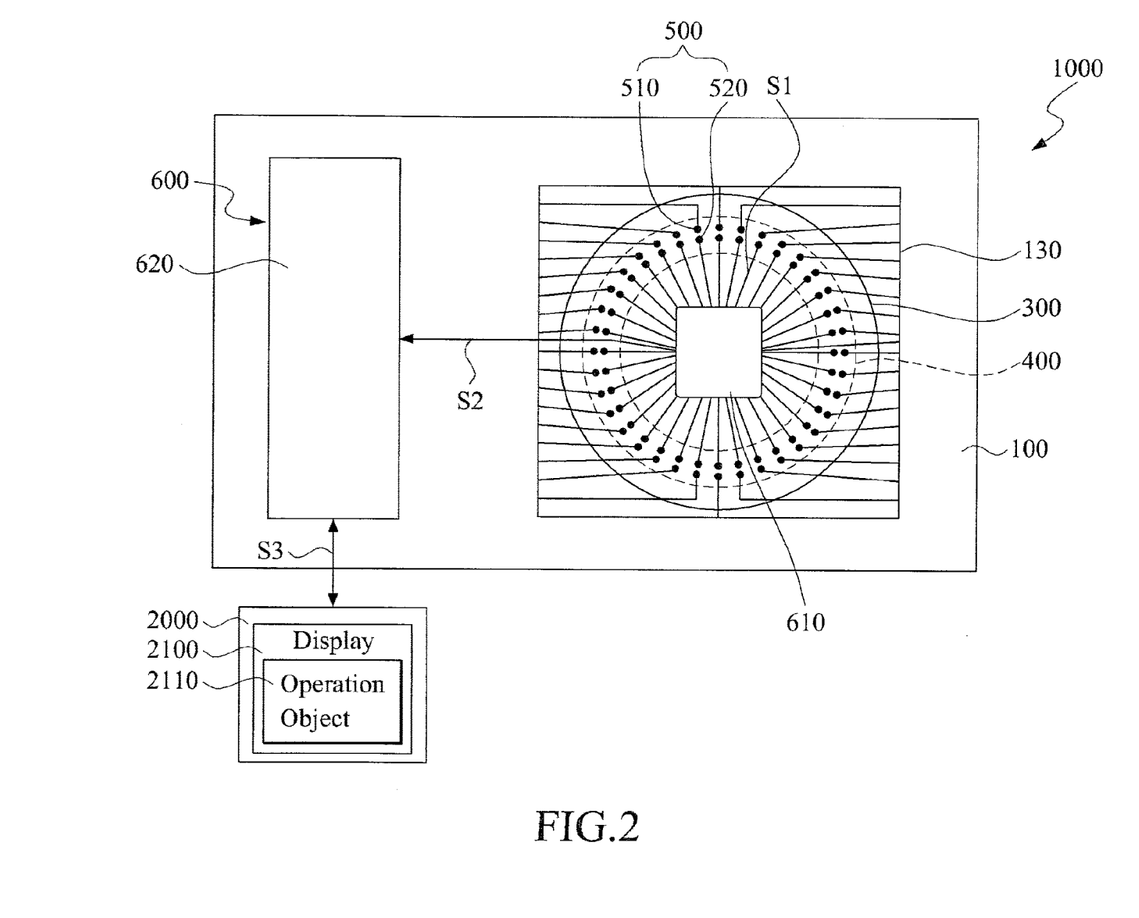
FIG. 2 is a top schematic diagram illustrating the pressure operating system of the first embodiment of the present invention.
Figure 3:
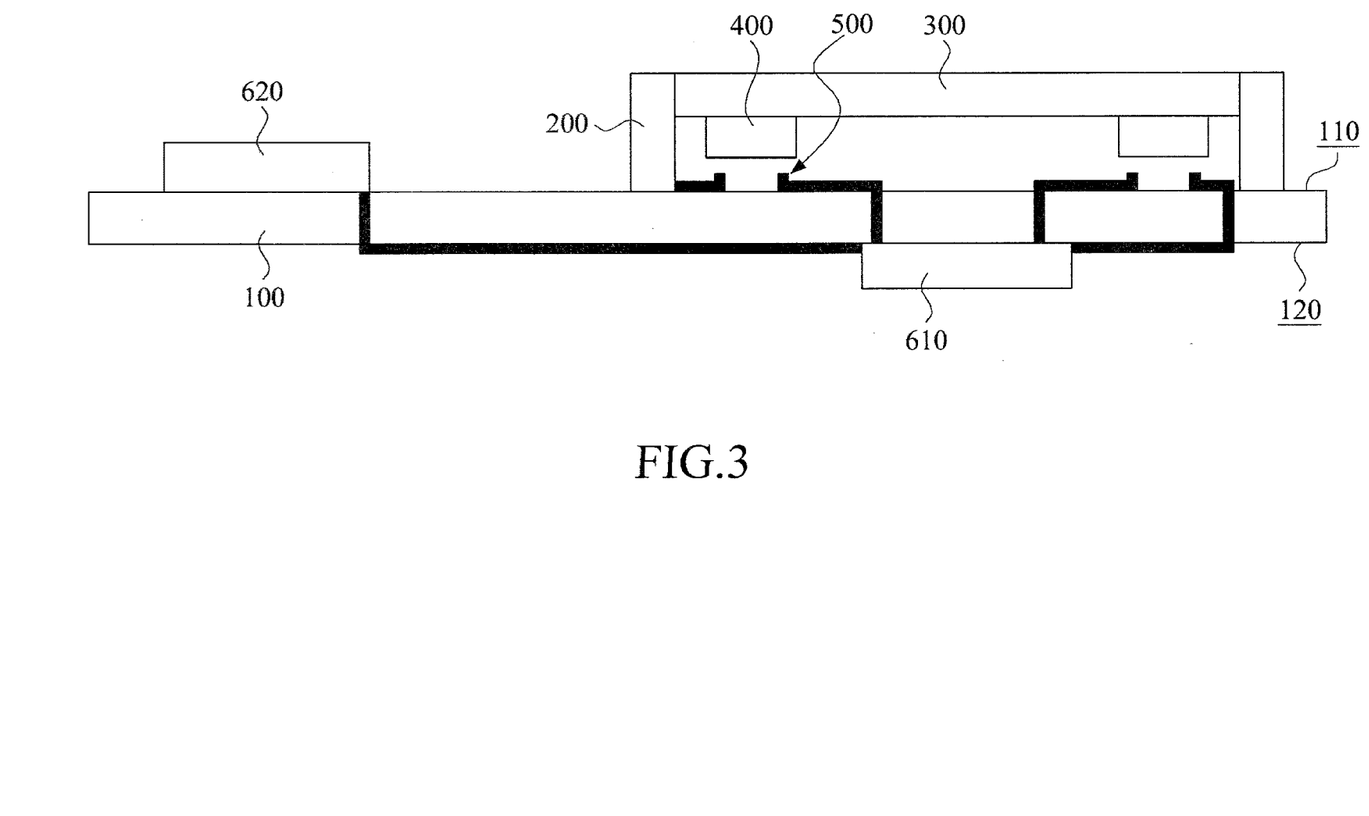
FIG. 3 is a cross-sectional schematic diagram illustrating the pressure operating system of the first embodiment of the present invention.

Please refer to FIG. 2 and FIG. 3. FIG. 2 is a top schematic diagram illustrating the pressure operating system of the first embodiment of the present invention, and FIG. 3 is a cross-sectional schematic diagram illustrating the pressure operating system of the first embodiment of the present invention. The pressure operating system includes a pressure operating apparatus 1000 and a computer 2000. The pressure operating apparatus 1000 is coupled to the computer 2000 including a display 2100. An operation object 2110 is displayed in the display 2100. The operation object 2110 can be a cursor or a movable image object. The pressure operating apparatus 1000 of the present invention is for operating the direction and velocity of the operation object 2110.

In another embodiment, the operation object 2110 can be a physical object, such as a robot, a robot arm, a remote operated vehicle etc, and the computer 2000 can be any device to controlling the movement of the operation object. For example, the device can be composed by a motor, a processor, and related circuit and mechanism.

The pressure operating apparatus 1000 includes a substrate 100, a supporting element 200, a insulating element 300, a conductive element 400, a plurality of switching element 500 and a processing module 600. The processing module 600 includes a signal transmission unit 610 and a signal analysis unit 620.

The substrate 100 can be a printed circuit broad. The substrate 100 has a first surface 110, a second surface 120 and a connection circuit 130. The supporting element 200 can be disposed on the first surface 110 of the substrate 100. The insulating element 300 can be connected with the supporting element 200, and disposed on the first surface 110. The conductive element 400 can be formed by conducting material, and disposed under the insulating element 300. Additionally, the conductive element 400 can be a conducting layer printed on the insulating element 300 by the manufacture method of the printed circuit board. The conductive element 400 is located a predetermined distance apart from the first surface 110. The insulating element 300 and the conductive element 400 can be formed by elastic material. The conductive element 400 can contact to the switching element 500 via pressing the insulating element 300.

The switching elements 500 can be a conducting layer formed by conducting material, and printed on the first surface 100 of the substrate 100. The switching elements 500 are apart from the conductive element 400 with a distance and are corresponding to the conductive element 400. The switching element 500 can be a short-circuit. The switching element 500 can be turned on, when the conductive element 400 is contacted to the switching element 500.

The switching element 500 further includes a first junction 510 and a second junction 520. The first junction 510 is adjacent to the second junction 520. The first junction 510 is insulated from the second junction 520. The first junction 510 and the second junction 520 are electrically connected to the signal transmission unit 610 via the connection circuit 130 respectively. When the conductive element 400 contacts to both of the first junction 510 and the second junction 520, the first junction 510 electrically contacts the second junction 520 via the conductive element 400. Finally, the first junction 510, the second junction 520, the connection circuit 130 and the signal transmission unit 610 are formed to be a circuit.

In the other embodiment, the first junction 510 is connected to the output port (not shown on figure) of the signal transmission unit 610 via the connection circuit 130, and the second junction 520 is connected to the input port (not shown on figure). The output port of the signal transmission unit 610 can send high potential signal or lower potential signal. For example, when the first junction 510 and the second junction 520 are electrically coupled each other, the input port of the signal transmission unit 610 can receive a high potential signal. Conversely, when the first junction 510 and the second junction 520 are not electrically coupled each other, the input port of the signal transmission unit 610 can receive a lower potential signal.

The signal transmission unit 610 of the processing module 600 can be formed by a chip, and disposed on the second surface 120 of the substrate 100. The signal transmission unit 610 can transmit a current to the first junction 510. When the first junction 510 and the second junction 520 are coupled to each other, the second junction 520 transmits the circuit to the signal transmission unit 610 to be a conductive signal S1.

The signal analysis unit 620 can be a chip and disposed on the first surface 110 of the substrate 100. When the signal analysis unit 620 is coupled to the signal transmission unit 610, the signal transmission unit 610 receives the conductive signal S1, and then transmits a control signal S2 to the signal analysis unit 620. The signal analysis unit 620 processes the control signal S2 to an operating signal S3 to control the operation object 2110. The pressure operating apparatus 1000 can transmit the operating signal S3 to computer 2000 via line or wireless to operate the operation object 2110. Since the art of transmitting signal via line or wireless is known in the art, a detailed description thereof is omitted herein for the sake of brevity.

Figure 4:
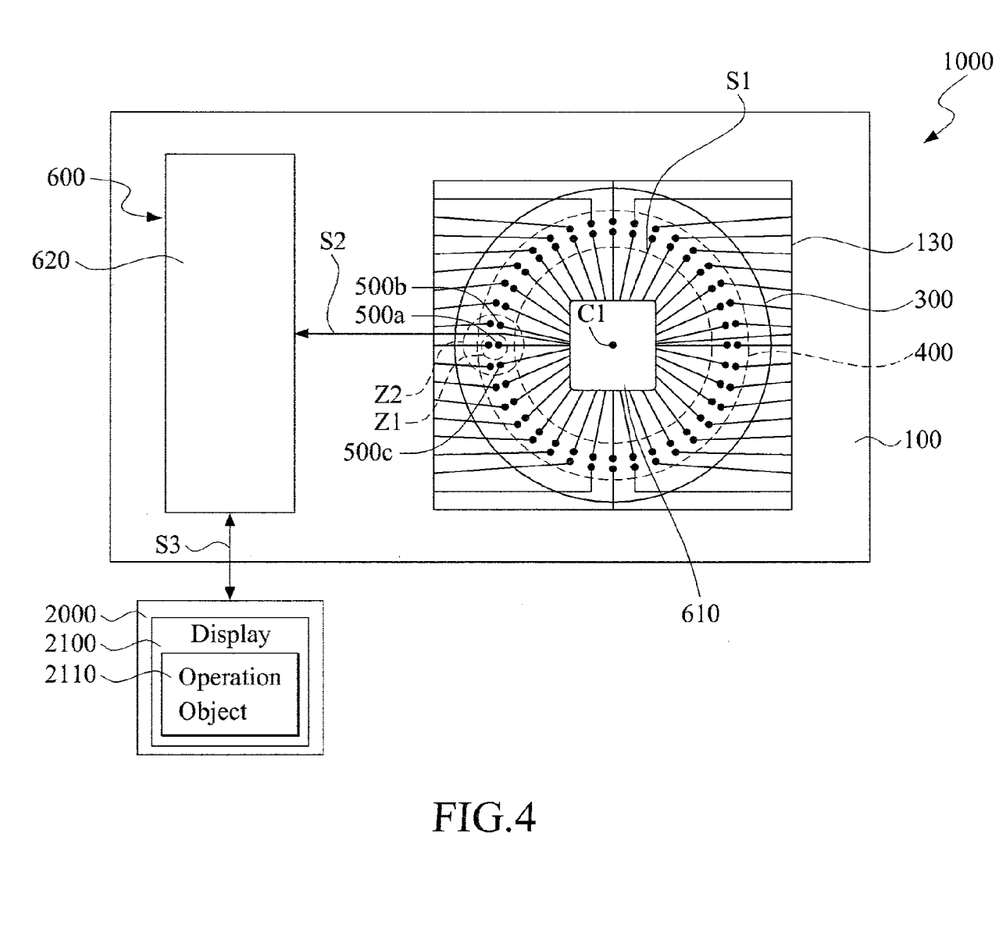
FIG. 4 is a schematic diagram that illustrates the first embodiment of the pressure operating apparatus.
Figure 4A:
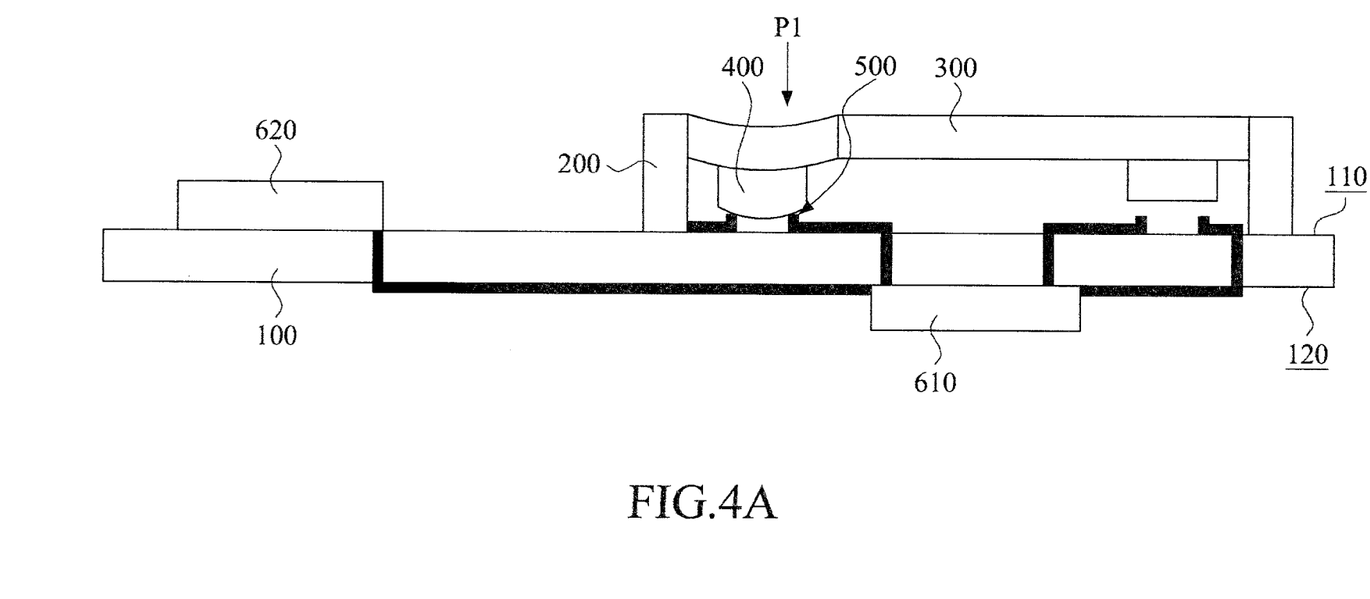
FIG. 4A is a schematic diagram that illustrates the first embodiment of the pressure operating apparatus.

FIGS. 4 and 4A are schematic diagrams illustrating the first embodiment of the pressure operating apparatus. Each of the switching elements 500 is defined a moving direction. In this embodiment, the switching elements 500 are angularly arranged at equal distant with respect to a centre of circle C1. In this case, there are thirty-six switching elements 500, and each of the switching elements 500 is separated in ten angles. Therefore, each of the switching elements 500 are defined a direction data according to the angle of 0 degree to 350 degree in clockwise or anticlockwise.

In this case, the operation object 2110 is a cursor displayed on the display 2100. When the user wants to move the cursor to the left on the display 2100, the user can press down the insulating element 300 at the first position P1 of FIG. 4A to let the conductive element 400 to contact the substrate 100 at the first position P1. Accordingly, the switching element 500a of the first zone Z can be turned on. If the direction data according the switching element 500a is defined as "leftward" (or 180 degree), the switching element 500a can send a conductive signal S1 to the signal transmission unit 610. Next, the signal transmission unit 610 sends a control signal S2 to signal analysis unit 620 depending conductive signal S1. The signal analysis unit 620 sends an operating signal S3 depending direction data to the computer 2000 to control the cursor moving leftward.

The precision of detecting the angle of pressing is determined by the number of the switching element 500. In this embodiment, there are thirty-six switching elements 500. Each of the switching elements is separated by 10 degree, and is defined with a direction data. According to thirty-six directions data, the present invention can control the operation object 2110 to move along thirty-six different directions. The motion of the operation object 2110 can be controlled precisely.

In the present invention, the number of the switching elements 500 is not limited. When the number of the switching elements 500 is increased, the angle between two switching elements 500 is decreased. For example, if there are seventy-two switching elements 500, the precision of determining the angle of pressing is five degree.

There is another method of determining the cursor moving in this embodiment. Each of the switching elements 500 is defined with a coordinate. The processing module 600 controls the operation object 2110 moving along a moving direction according to a vector that is defined by the coordinate of the turned on switching element 500 and a reference coordinate. In this case, the reference coordinate can be the center of circle C1.

When there are many switching elements 500 be turned on, the signal analysis unit 620 can control the moving direction, velocity and acceleration of the operation object 2110, wherein the moving direction is according to the average of the direction data of the turned on switching element 500, and the velocity and the acceleration is according to the number of the turned on switching elements 500. In the other words, when at least two switching elements 500 are turned on, the velocity and the acceleration of the operation object 2110 is faster than only one switching element 500 be turned on. Because the number of the turned on switching elements 500 is in direct proportion to the pressure of the user pushing the insulating element 300, the present invention can transform the pressure as the velocity and acceleration of the operation object 2110.

In the present invention, one user can press the insulating element 300 by a greater force to let the conductive element 400 contacting second zone Z2 of the first surface 110 of the substrate 100. The second zone Z2 is bigger than the first zone Z1, and the second zone Z2 covers three switching elements 500a 500b 500c. All of the three switching elements 500a 500b 500c send the conductive signal S1 respectively to the signal analysis unit 620. When the signal analysis unit 620 receives the control signal S2, the signal analysis unit 620 can analyze the control signal S2 to know the switching elements 500a 500b 500c are turned on and calculate moving direction according to the average of the direction data of the switching elements 500a 500b 500c. For example, the direction data of the switching element 500a is 180 degree, the direction data of the switching element 500b is 170 degree, and the direction data of the switching element 500c is 190 degree. The average of the three direction data is 180 degree, and the signal analysis unit 620 controls the operation object 2110 moving to the direction of 180 degree. Because there are three switching elements 500 are turned on, the pressures of the user pressing on the insulating element 300 is greater. The signal analysis unit 620 adds the velocity of the cursor.

Repeat the above steps, the moving direction and velocity can be changed. Therefore, the cursor can be moved easily on the display 2100.

Figure 5:
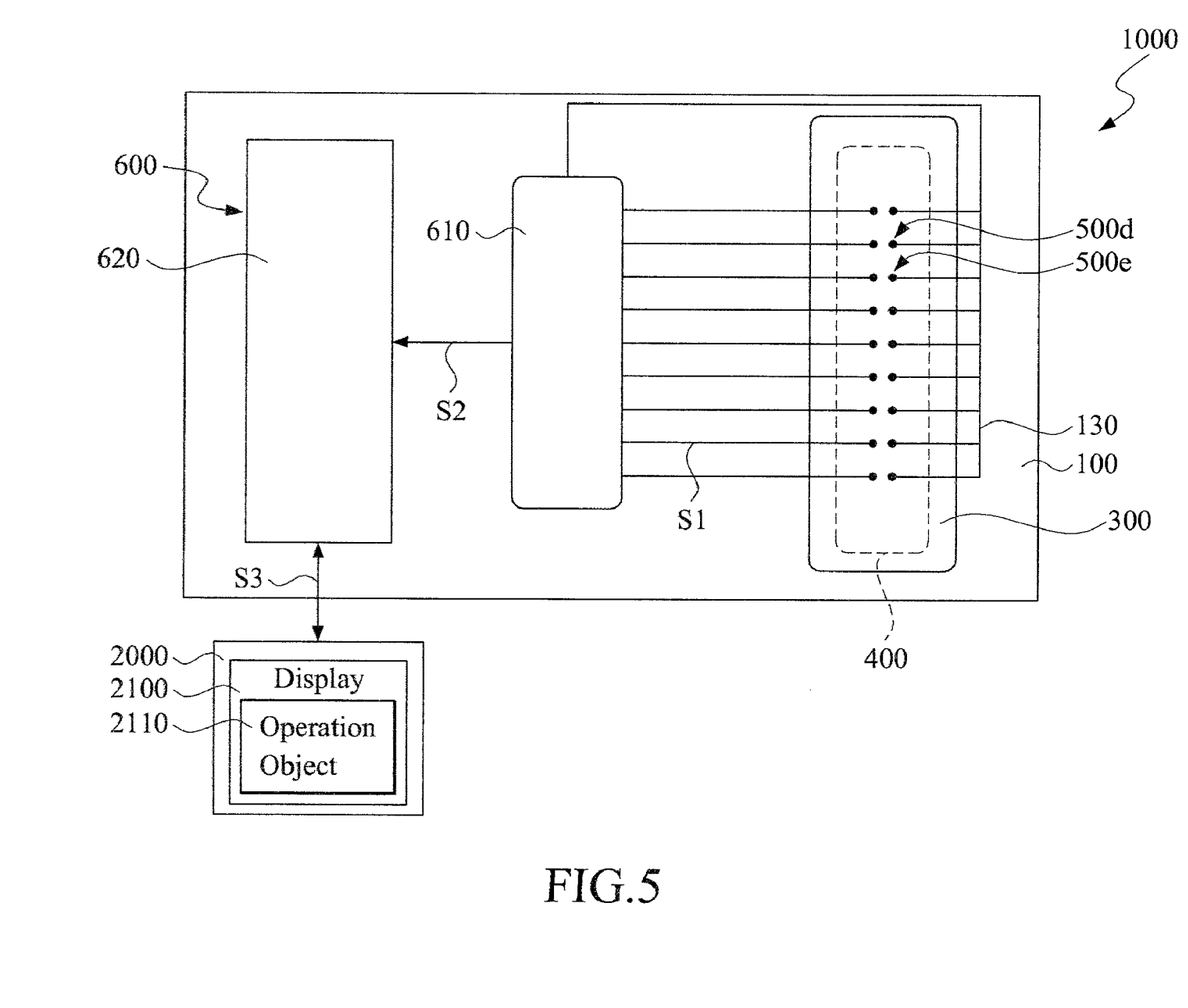
FIG. 5 is a top schematic diagram that illustrates the pressure operating system of the second embodiment of the present invention.

Please refer to FIG. 5, which is a top schematic diagram illustrating the pressure operating system of the second embodiment of the present invention. There are some different from the first embodiment. The switching elements 500 are arranged in a row. One user can operate the pressure operating apparatus 1000 to make the operation object 2110 moving along an axis according to the operating method of the first embodiment.

There are another operating method to operate the pressure operating system of the second embodiment. The switching elements 500 are defined a first switching element 500d and a second switching element 500e, wherein the first switching element 500d is close to the second switching element 500e. The first switching element 500d can transmit a first conductive signal, and the second switching element 500e can transmit a second conductive signal. The processing module 600 analyzes the receive sequence of the first conductive signal and second conductive signal to operated the moving direction of the operation object 2110.

For example, the first switching element 500d is turned on first, and the processing module 600 will receive the first conductive signal earlier. Next, when the second switching element 500e is turned on, the processing module 600 will receive the second conductive signal S1 later. Accordingly, the processing module 600 can control the movement of the operation object 2110 from the up toward down. Conversely, when the processing module 600 receives sequentially the second conductive signal and then the first conductive signal, the processing module 600 controls the movement of the operation object 2110 from the down toward up.

In another way to practice the method above, the first switching element 500d and the second switching element 500e are defined a first coordinate and a second coordinate respectively. The first coordinate and the second coordinate are included in the first conductive signal and second conductive signal respectively. The processing module 600 can calculate the moving direction of the operation object 2110 according to the receive sequence of first coordinate of the first conductive signal and the second coordinate of the second conductive signal. The above described method can be applied in other embodiments of the present invention.

The processing module 600 can determine the velocity of the operation object 2110 depending on the time of receiving the first conductive signal and second conductive signal. For example, the first conductive signal is generated at a first time and the second conductive signal is generated at a second time. When the time difference of the first time and the second time is shorter, it is to present that the velocity of a finger of a user slipping and pressing on the insulating element 300 is faster. The processing module 600 will control the operation object 2110 moving faster. The method of moving the operation object 2110 can be used in other embodiments.

Figure 6:
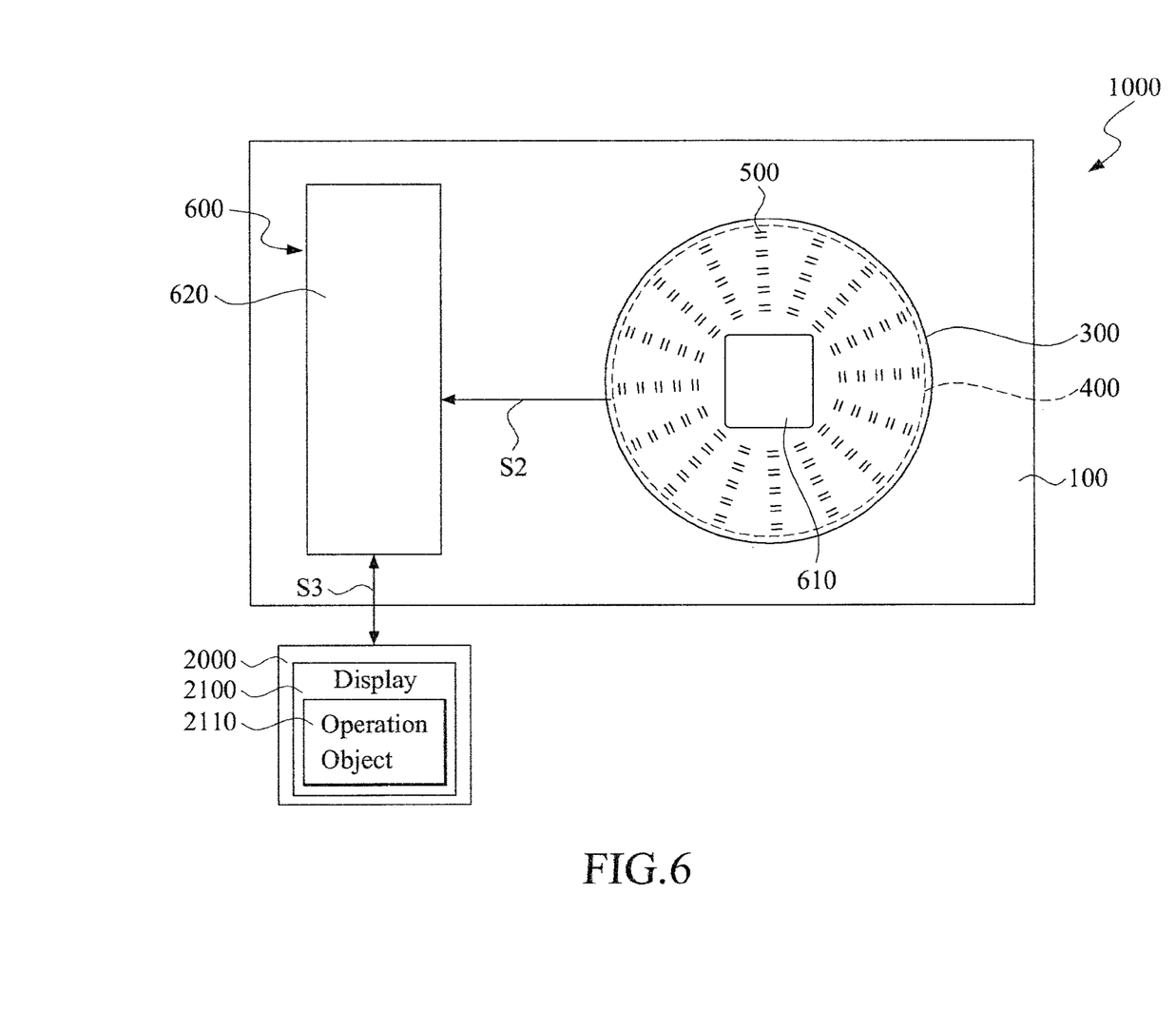
FIG. 6 is a top schematic diagram that illustrates the pressure operating system of the third embodiment of the present invention.

Please refer to FIG. 6, which is a top schematic diagram illustrating the pressure operating system of the third embodiment of the present invention. There are some differences from the first embodiment described below. The switching elements 500 are arranged in multiple circular permutations. As FIG. 6, the switching elements 500 are arranged in five circles. Each of the switching elements 500 is connected to the signal transmission unit 610. Optionally, the number of the circles and the number of the switching elements 50 in one circle are not limited in the present invention.

As shown on FIG. 6, each of one circle has 16 switching element 500 as equal distant. Each of the switching elements 500 is separated in 22.5 degree. All of signal of the switching elements 500 are transmitted to the signal transmission unit 610. The signals of the switching elements 500 are calculated by the signal analysis unit 620 to generate the velocity and direction data. The velocity can be calculated according to the number of the switching element 500 be turned on in single circuit and an angle direction.

Figure 7:
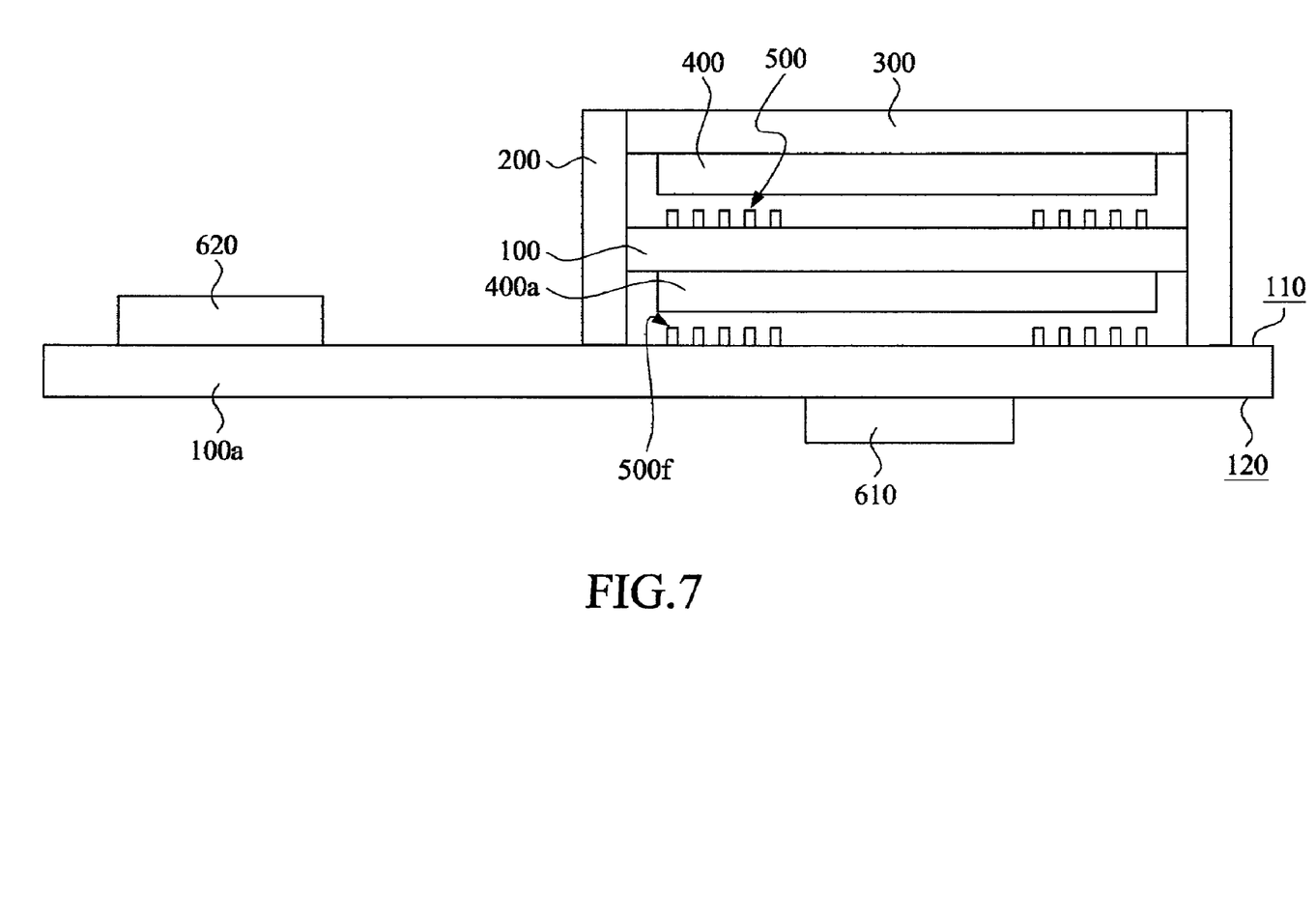
FIG. 7 is a cross-sectional schematic diagram that illustrates the pressure operating apparatus of the fourth embodiment of the present invention.

Please refer to FIG. 7, which is a cross-sectional schematic diagram illustrating the pressure operating apparatus of the fourth embodiment of the present invention. There are some differences from the third embodiment. The switching elements 500 are disposed in a plurality of layers and arranged in multiple circular permutations. There is a plurality of conductive elements 400. In this embodiment, there are two layers. However, at least three layers are included in the present invention. As shown on FIG. 7, there are a bottom substrate 100a, a plurality of bottom switching elements 500f, a bottom conductive element 400a, a substrate 100, a switching element 500, a conductive element 400, and an insulating element 300 in sequence. The bottom switching element 500f is disposed on the bottom substrate 100a. The bottom conductive element 400a is distance from the bottom switching element 500f a predetermined bottom distance above the bottom substrate 100a. The substrate 100 is disposed on the first surface 110 of the bottom conductive element 400a.

When the user press down the insulating element 300 slightly, the conductive element 400 will turn on at least on switching element 500, but the bottom conductive element 400a does not contact bottom switching element 500f this time. In this case, the method of determining the velocity and direction of the operation object 2110 is the same as the pre-described embodiment and the operation object 2110 is moved on a reference plane, when the user presses down slightly on the insulating element 300.

When the user presses the insulating element 300 with greater force, the conductive element 400 turns on at least one switching elements 500 and the bottom conductive element 400a turns on at least one bottom switching element 500f. The turned on switching elements 500 generate the conductive signals, and the turned on bottom switching elements 500f generate bottom conductive signals. The present invention can determine the difference force of pressing the insulating element 300. The processing module 600 can control a velocity of the operation object 2110 in a direction perpendicular to the reference plane according to the number of the turned on conductive signal S1 and bottom conductive signal.

In this method, the grade range of the velocity can be greater. For example, if there is only one switching element 500 be turned on, it will be defined as level one of the velocity. If there are two switching element 500 be turned on, it will be defined as level two of the velocity. If there are two switching elements 500 and one bottom switching element 500f be turned on, it will be defined as level three of the velocity.

Figure 8:
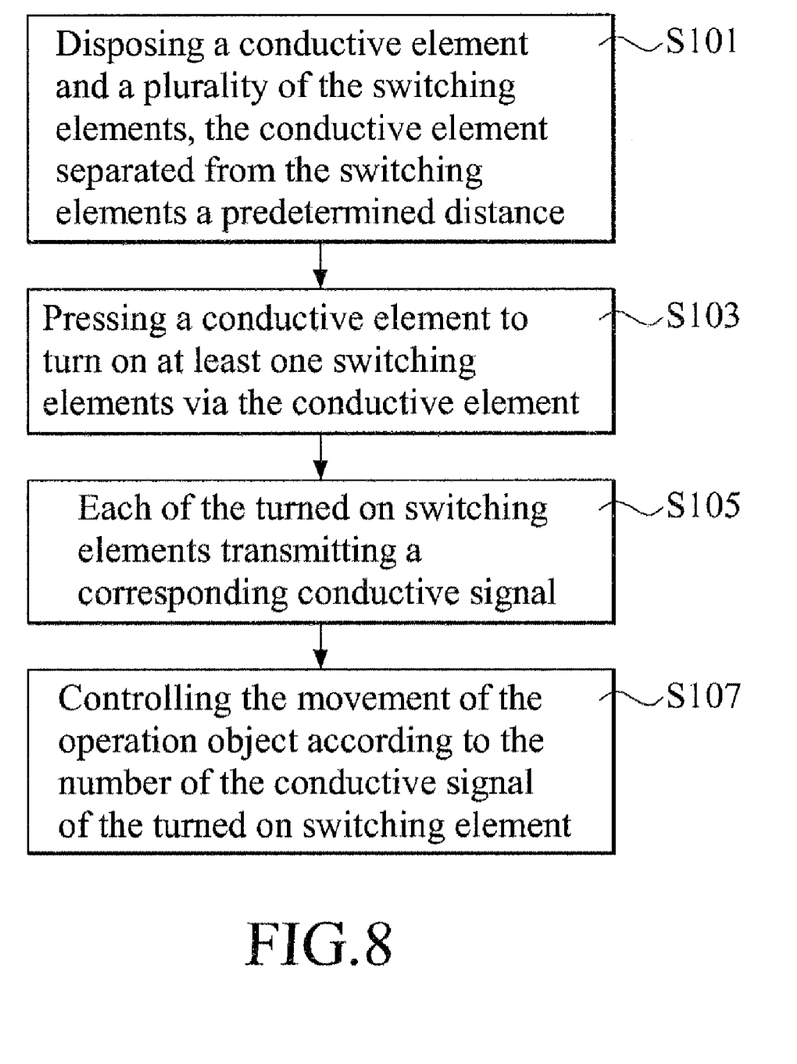
FIG. 8 is a flow chart that illustrates the operating method of the pressure operating apparatus of the present invention.

Please refer to FIG. 8, which is a flow chart illustrating the operating method of the pressure operating apparatus of the present invention. The element marks listed below, please refer to FIG. 1 to FIG. 7. The steps of the operating method of the pressure operating apparatus 1000 are described below.

The pressure operating apparatus of the present invention includes the conductive element 400 and switching elements 500. The conductive element and the switching elements 500 are separated from a predetermined distance (STEP S101).

When the conductive element 400 is pressed, at least one switching element 500 is turned on by the conductive element 400 (STEP S103). Therefore, each of the switching element 500 generates a conductive signal S1 (STEP S105).

The direction and velocity of the operation object 2110 can be controlled according to the number of the conductive signal S1 received simultaneously. When the number of the conductive signal S1 generated is more, the force of the user pressing the conductive element 400 is greater and the velocity of the operation object 2110 is faster.

The method of controlling the operation object 2110 moving has some different ways. The first way is that each of the switching element 500 is defined a moving direction data. The processing module 600 controls the moving direction of the operation object 2110 according to the average of the moving direction data of the turned on switching elements 500.

The second way is that each of the switching elements 500 is defined a coordinate, the processing module 600 controls the moving direction of the operation object 2110 according to vector defined by the coordinates of the turned on switching elements 500 and a reference coordinate (STEP S107).

Figure 9:
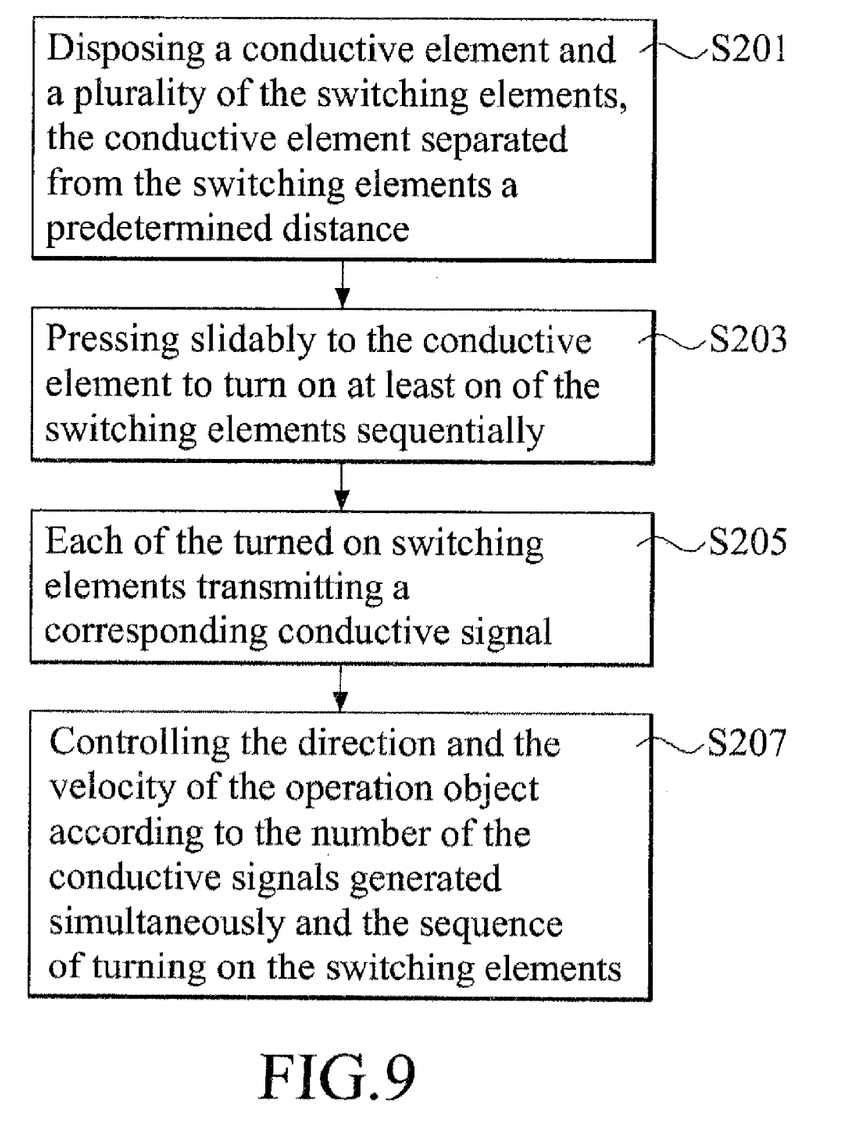
FIG. 9 is another flow chart that illustrates the operating method of the pressure operating apparatus of the present invention.

Please refer to FIG. 9, which is another flow chart illustrating the operating method of the pressure operating apparatus of the present invention. The steps of the operating method of the pressure operating apparatus 1000 are described below.

The pressure operating apparatus of the present invention includes the conductive element 400 and switching elements 500. The conductive element and the switching elements 500 are separated from a predetermined distance (STEP S201).

The conductive element 400 is pressed slidably to turn on at least on of the switching elements 500 sequentially (STEP S203).

Each of the turned on switching elements transmits a corresponding conductive signal S1 (STEP S205).

The processing module 600 controls the direction and the velocity of the operation object 2110 according to the number of the conductive signals S1 generated simultaneously and sequence of the switching elements 500 turned on (STEP S207).

In conclusion, the pressure operating apparatus 1000 of the present invention controls the moving direction and velocity of the operation object 2110 according to the number of the turn on conductive element 400. The switching element 500 contacts the conductive element 400 mechanically. Accordingly, the present invention can overcome the unsteady current and the electromagnetic wave interference of the prior art. Additionally, the present invention can control the velocity of the operation object 2110 according to the force pressed on the conductive element 400 and the number of the turned on switching elements 500. The present invention can also control the moving direction of the operation object 2110 according to the turned on switching elements 500.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pressure operating apparatus to operate an operation object, the pressure operating apparatus comprising:
    a plurality of substrates arranged in a stacked spaced apart relationship each with respect to each other, said plurality of substrates including a first substrate and at least one second substrate;
    a plurality of first switching elements disposed on the first substrate;
    a plurality of second switching elements disposed on the second substrate;
    a first conductive element displaced by a first predetermined distance, from said first switching elements;

at least one second conductive element displaced by a second distance from said second switching elements and located between said first and second substrates;

wherein, under a pressure applied thereto, said first conductive element contacts at least one of the plurality of first switching elements, thereby actuating said first switching element to transmit at least one first conductive signal; and wherein, when said pressure exceed a pressure threshold, said second conductive element contacts at least one of sais plurality of second switching elements, thereby actuating said second switching element to transmit at least one second conductive signal; and a processing module, said processing module, upon receipt of said first conductive signal and said at least one second conductive signal, controls the motion of the operation object according to a number of first and second conductive signals corresponding to the number of said first and second switching elements actuation on said first and second substrates.

2. The pressure operating apparatus according to claim 1, wherein the processing module further controls the velocity of the motion of the operation object according to the number of the first and second conductive signals of the actuated switching elements.

3. The pressure operating apparatus according to claim 1, wherein each of the first and second substrates is a printed circuit board, and wherein each of said plurality of first and second switching elements is a printed circuit printed on the printed circuit board.

4. The pressure operating apparatus according to claim 1, wherein each of the first and second switching elements is composed of a first junction and a second junction, the first junction being insulated from the second junction, and wherein, when the first junction and the second junction are contacted by a respective one of said first and second conductive elements, the first junction is electrically connected to the second junction via the respective conductive element.

5. The pressure operating apparatus according to claim 1, further comprising an insulating element, wherein said first conductive element is disposed at the insulating element in alignment with a respective one of said plurality of first switching elements, and wherein said first conductive element is positioned between said insulating element and said first substrate.

6. The pressure operating apparatus according to claim 1, wherein the processing module further comprises:

a signal transmission unit receiving said first and second conductive signals to generate a control signal; and a signal analysis unit receiving the control signal representative of a moving direction and a velocity of the operation object, and generating an operating signal to control the operation object.

7. The pressure operating apparatus according to claim 1, wherein each of the first and second switching elements includes a first switching element portion and a second switching element portion, wherein the first switching element portion transmits a first conductive signal, and wherein the second switching element portion transmits a first conductive signal.

8. The pressure operating apparatus according to claim 7, wherein the processing module controls a moving direction of the operation object according to the sequence of transmission of said first conductive signal and said second conductive signal.

9. The pressure operating apparatus according to claim 7, wherein each of said first switching element portion and the second switching element portion is defined with a first coordinate and a second coordinate, respectively, wherein each of the first coordinate and the second coordinate is included in the respective one of said first conductive signal and said second conductive signal, respectively, and wherein the processing module controls a moving direction of the operation object according to the sequence of receiving the first conductive signal and the second conductive signal.

10. The pressure operating apparatus according to claim 1, wherein each of said first switching elements is defined by moving direction data, wherein the processing module controls the motion of said operation object along a moving direction according to the moving direction data of the actuated first switching elements.

11. The pressure operating apparatus according to claim 1, wherein when said at least one of the first switching elements is actuated, the operation object is moved in a single plane, and wherein, when said at least one of the first switching elements and said second switching element are actuated, the motion of said operation object is controlled in three-dimensional format.

* * * * *